(12) United States Patent
Fawad et al.

(10) Patent No.: US 11,914,091 B2
(45) Date of Patent: Feb. 27, 2024

(54) ROCK PHYSICS MODEL FOR FLUID IDENTIFICATION AND SATURATION ESTIMATION IN SUBSURFACE RESERVOIRS

(71) Applicants: Manzar Fawad, Oslo (NO); Md Nazmul Haque Mondol, Oslo (NO)

(72) Inventors: Manzar Fawad, Oslo (NO); Md Nazmul Haque Mondol, Oslo (NO)

( * ) Notice: Subject to any disclaimer, the term of this patent is extended or adjusted under 35 U.S.C. 154(b) by 0 days.

(21) Appl. No.: 17/576,955

(22) Filed: Jan. 16, 2022

(65) Prior Publication Data

US 2022/0236438 A1    Jul. 28, 2022

Related U.S. Application Data

(60) Provisional application No. 63/140,891, filed on Jan. 24, 2021.

(30) Foreign Application Priority Data

Jan. 23, 2021 (NO) .................................. 20210087

(51) Int. Cl.
  *G01V 1/50*         (2006.01)
  *E21B 49/08*        (2006.01)

(52) U.S. Cl.
  CPC ............ *G01V 1/50* (2013.01); *E21B 49/0875* (2020.05); *E21B 2200/20* (2020.05);
  (Continued)

(58) Field of Classification Search
  None
  See application file for complete search history.

(56) References Cited

U.S. PATENT DOCUMENTS

5,583,825 A * 12/1996 Carrazzone ............ G01V 1/288
                                                       367/83
6,269,311 B1 * 7/2001 Berryman ............... G01V 1/306
                                                       367/75

(Continued)

FOREIGN PATENT DOCUMENTS

NO          201901431 A   *  6/2021

*Primary Examiner* — Lina Cordero
(74) *Attorney, Agent, or Firm* — Ingenium Patents LLC; Peter R Kramer

(57) ABSTRACT

A method for fluid identification (water, oil, gas or CO2) and saturation estimation in subsurface rock formations using the prestack inverted seismic data by calculating the target fluid saturation ($S_{fl}$)(114) in a reservoir given the magnitude obtained from the P- to S-wave velocity ratio (Vp/Vs) (103), and acoustic impedance (AI) (102) extracted from the seismic data inversion, comprising the following steps: a) obtaining wireline log data within a zone of interest in a nearby well (101) and determining the suitable cementation and mineralogy factors by calibrating the background water-bearing sand trend with the reference 0% (or 0 fraction) $S_{fl}$ curve onto the acoustic impedance-Vp/Vs ratio plane (110), b) calibrating $S_{fl}$ computed from the acoustic impedance-Vp/Vs ratio curves with $S_{fl}$ obtained from a conventional method by iterating P-wave velocity ($Vp_{fl}$) and density ($\rho_{fl}$) of the target fluid (111), c) obtaining inverted seismic data in the form of Acoustic Impedance (AI) (102) and Vp/Vs ratio (103) cubes, and d) calculating the target fluid saturation using the calibrated rock physics model inputting the obtained parameters from model calibration (cementation factor, mineralogy factor, density and P-wave velocity of the target fluid) along with inverted Vp/Vs ratio and acoustic impedance cubes data (113), resulting in a $S_{fl}$ cube (114).

13 Claims, 8 Drawing Sheets

(52) U.S. Cl.
CPC ............... *G01V 2210/1299* (2013.01); *G01V 2210/1429* (2013.01); *G01V 2210/6222* (2013.01)

(56) References Cited

U.S. PATENT DOCUMENTS

| | | | |
|---|---|---|---|
| 6,421,611 B1* | 7/2002 | Kelly | G01V 1/28 |
| | | | 702/18 |
| 7,373,251 B2* | 5/2008 | Hamman | G01V 1/306 |
| | | | 702/14 |
| 7,516,015 B2* | 4/2009 | Sinha | G01V 1/50 |
| | | | 702/6 |
| 2009/0306899 A1* | 12/2009 | Harris | G01V 3/083 |
| | | | 702/14 |
| 2010/0142323 A1* | 6/2010 | Chu | G01V 11/00 |
| | | | 367/73 |
| 2018/0038974 A1* | 2/2018 | Roy | G01V 1/48 |
| 2022/0236439 A1* | 7/2022 | Fawad | G01V 1/50 |

\* cited by examiner

ROCK PHYSICS MODEL FOR FLUID IDENTIFICATION AND SATURATION ESTIMATION IN SUBSURFACE RESERVOIRS

THE OBJECT OF THE INVENTION

The present invention is a rock physics model that relates generally to the field of exploration geophysics, and more particularly to identification and characterization of potential hydrocarbon (oil, gas, and natural gas liquids) or $CO_2$ storage reservoirs in onshore and offshore sedimentary basins, using prestack inverted seismic (Acoustic impedance and Vp/Vs ratio) data acquired onshore or offshore. The invention also relates to subsurface formation interval P-wave velocity (Vp), S-wave velocity (Vs), and bulk density (RHOB) measured from borehole logs in a well as means to calibrate with the output obtained from the inverted data from seismic data.

BACKGROUND FOR THE INVENTION

The prestack inversion of seismic data has in recent years become a valuable tool in investigating potential hydrocarbon-bearing formations. Seismic surveys in general, when used in combination with other available geophysical, borehole, and geological data, provide useful information about the structure and distribution of subsurface rock properties and their interstitial fluids. Oil companies employ interpretation of such seismic data for selecting the sites to drill oil and gas exploratory and development wells. The seismic surveys while providing maps of geological structures also yield useful information for rock typing, fluid identification and quantification.

When borehole logs are available from nearby wells, seismic survey and the subsequent inverted data can be enhanced and calibrated by combining it with the log data.

Extracting reservoir properties from seismic data has always been an objective of geophysicists since commercial seismic data has been used for hydrocarbon exploration. Standard reservoir characterization workflows comprise seismic inversion and amplitude-variation-with-offset (AVO) or amplitude-variation-with-angle (AVA) analysis. The change in amplitude with angle has long been demonstrated by Zoeppritz in 1919 (Zoeppritz, 1919). Since the Zoeppritz equations were not intuitive, many approximations to solve AVO/AVA have been presented over the years (e.g., Aki and Richards, 1980; Fatti et al., 1994; Goodway et al., 1997; Shuey, 1985; Smith and Gidlow, 1987; Verm and Hilterman, 1995).

Since AI is a function of zero-offset reflection, an elastic impedance (EI) can be computed for non-normal incident angles (Connolly, 1999). The EI contains fluid information. The EI method is further improved by Whitcombe et al. (2002), calling it Extended Elastic Impedance (EEI) with the option of a theoretical rotation angle (chi) from −90° to +90° in the intercept-gradient crossplot space. Particular rotation angles are related to elastic parameters, such as Lambda-Mu-Rho (LMR) (Goodway et al., 1997), and the compressional (P) to shear (S) wave velocity ratio (Vp/Vs). The LMR parameters are useful lithology and fluid discriminators.

In terms of layer properties, the EEI represents a rotation of a straight line in a crossplot of AI versus Vp/Vs (Avseth et al., 2014; Avseth and Veggeland, 2015). Since the background trend in the AI-Vp/Vs domain is highly nonlinear due to the complex relationship between compaction and rock-physics properties, Avseth et al. (2014) proposed new equations "CPEI-Curved Pseudo Elastic Impedance" and "PEIL-Pseudo Elastic Impedance" as fluid and rock stiffness indicators respectively. This method aims to extract an attribute consistent with a rock physics template (RPT) that takes into account compaction and cementation (Avseth and Veggeland, 2015). This (CPEI) method is most relevant to our method of invention as it employs the AI and Vp/Vs values directly to indicate the presence of hydrocarbon. However, the CPEI method is not flexible in terms of input parameters and the resulting fluid saturation values are not normalized in fraction or percentage.

Recently, Lehocki et al. (2019) suggested an inversion of the Zoeppritz equation (Zoeppritz, 1919) to obtain the ratio of the density of two layers at the layers' interface. The distinction seemed possible employing the density ratio technique even in (initially) cemented rocks as the diagenetic cement dampens the fluid effect on elastic properties. This technique is in a developing stage and needs testing in other lithology-fluid environments.

Regarding the patents, the Norwegian Patent Application NO20191431 published on Jun. 7, 2021 disclosed a method for fluid identification and saturation estimation in subsurface rock formations using the Controlled Source Electromagnetic (CSEM) data and Seismic Data by calculating the fluid saturation ($S_{fl}$ in a reservoir given the resistivity obtained from CSEM data, and acoustic impedance obtained from the seismic data. The fluid saturation ($S_{fl}$ is calculated using a rock physics model inputting the resistivity of water as the background resistivity along with inverted CSEM and acoustic impedance, resulting in a $S_{fl}$ profile.

U.S. Patent Application US5583825A Published on Dec. 10, 1996 related to a method for deriving reservoir lithology and fluid content for a target location from prestack seismic reflection data. The results of the inversion process are a set of subsurface elastic parameters for both the target and calibration locations. Relative magnitudes of these parameters are compared, together with the known subsurface lithology and fluid content at the calibration location, to extract the subsurface lithology and fluid content at the target location.

US6269311B1 published on Jul. 31, 2001 demonstrated fluid saturation calculations using only seismic velocity measurements (e.g. P- and S-wave velocity data). When the seismic velocity data are collected over a large region of a formation having both like and unlike materials, the method first distinguishes the like materials by initially plotting the seismic velocity data in a ($\rho/\lambda$, $\mu/\lambda$) plane to determine regions of the formation having like solid material properties and porosity.

US20090306899A1 published on Dec. 10, 2009 was a Joint processing method of seismic and controlled source electromagnetic (CSEM) surface data. The joint processing was performed by using a common rock physics model which related reservoir properties (such as porosity, lithology, saturation, and shaliness) to surface seismic AVO (or AVA) data. The electrical conductivity in the procedure was modeled by using Simandoux equation that uses porosity to relate the electrical conductivity with the seismic output.

US20100142323A1 published on Jun. 10, 2010 disclosed a method for inversion of time-lapse (4D) seismic data (a base survey and a later monitor survey of the same subsurface formation) to estimate the change in fluid saturation and reservoir pressure from the time of the base survey to the time of the monitor survey. The procedure comprised inverting the 4D seismic data at least one well location to directly obtain formation pressure change and fluid saturation change for at least one formation fluid, constraining the inversion with well log data, and using the saturation and pressure change from at least one well location to estimate saturation and pressure change away from the well locations.

US6421611B1 published on Jul. 16, 2002 used amplitude change with angle of incidence (AVA) in conjunction with rock property relationships to determine pay saturation for a variety of situations. These situations include different cases prompting the usage of reflected compressional (P-P) and shear (P-S) wave data with or without neglecting anisotropy and absorption.

US7373251B2 published on May 13, 2008 utilized acoustic impedance (AI) values from seismic data to predict a designated rock or fluid property in a subsurface geologic volume. In the procedure, a first predicted value of the designated rock or fluid property is compared to the seismic value of acoustic impedance to determine a difference between the predicted and seismic values of AI. The difference is gradually reduced by making a subsequent prediction.

All these methods, except the CPEI (Avseth et al., 2014; Avseth and Veggeland, 2015), used indirect ways, or additional property (i.e., resistivity) to solve for the fluid saturation. There had been a need to directly relate acoustic impedance with the Vp/Vs ratio with a flexibility to calibrate locally, in consideration of the rock matrix, fluid properties and the in-situ conditions using bore-hole data.

BRIEF SUMMARY

Therefore, the present invention's main objective is to provide a better and innovative method for the estimation of saturation in subsurface rock formations using the acoustic impedance and Vp/Vs ratio obtained by inversion from seismic data. The above-mentioned shortcomings associated with the prior art are addressed by way of the following novel improvements.

1) Corning up with a new rock physics model that relates the Vp/Vs ratio with acoustic impedance (AI), bypassing the use of elastic moduli (Bulk modulus, Shear modulus etc.) typically used to establish the relationship between these properties.
2) Circumvent the use of Gassmann equation (Gassmann, 1951) for fluid substitution. The Gassmann equation is useful; however, it requires the input variables at moduli level (Bulk modulus, Shear modulus etc.) instead of directly using the P- and S-wave velocities.
3) An essential part of this method is that the model can be calibrated using the nearest well penetrated in the zone of interest. The calibration yields the water-bearing (or brine) trend onto the AI-Vp/Vs plane by iterating the stress level/cementation and mineralogy factors.

These upper mentioned benefits are aimed at addressing the deficiencies in the prior art. The improved method is disclosed according to the appended independent claim. Advantageous further developments are subject of the dependent claims.

A first aspect of the present invention relates to a method for the estimation of fluid saturation in a reservoir comprising the following steps:
a) obtaining P-wave transit time ($\Delta t_p$), S-wave transit time ($\Delta t_s$), and bulk density (RHOB) data from the nearest well within the zone of interest. Converting the relevant data to acoustic impedance, Vp and Vs, finally plotting it onto the AI-Vp/Vs ratio function plane to obtain the stress/cementation factor, mineralogy factor, target fluid's P-wave velocity (Vii) and density ($\rho_{fl}$) while calibrating the model in terms of the brine trend and saturation,
b) obtaining inverted seismic data in the form of acoustic impedance (AI) and Vp/Vs ratio,
c) calculating the fluid saturation ($S_{fl}$) using the calibrated rock physics model inputting the AI and Vp/Vs cubes from inverted seismic data.

BRIEF DESCRIPTION OF THE DRAWINGS

Other features and advantages of the invention will be better understood from the following detailed description and the attached drawings in which.

DETAILED EXAMPLE

The method of the invention comprises the use of AI and Vp/Vs inverted from seismic data, calibrated by well-logging tools making it possible to separate the influence of fluids (oil, gas or $CO_2$) other than in-situ saline water and, thus, to estimate the fluid saturation within sedimentary rocks. Subsurface clean reservoirs may generally consist of two components: (1) the rock matrix (e.g., quartz grains), and (2) the fluid(s) within the pore space (water, oil/gas or $CO_2$).

Figure 1:
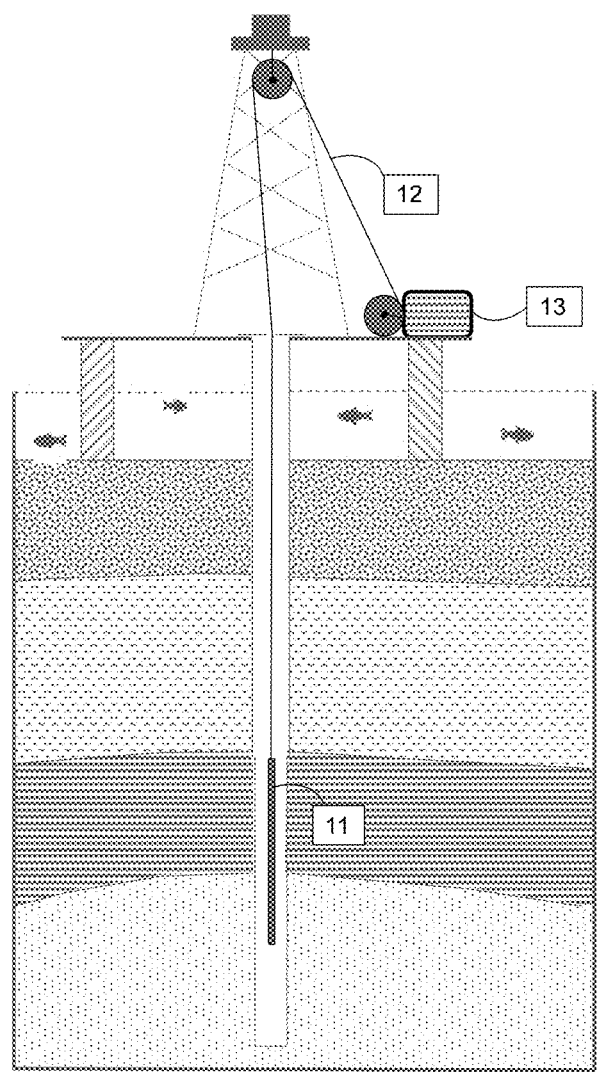
FIG. 1 illustrates typical wireline log data acquisition for subsurface P- and S-sonic transit time, rock bulk density and other physical properties determination.

Data obtained from the wellbore may include so-called "well log" data. Such data are typically recorded and presented against depth in the subsurface of various physical parameters measured by probes lowered into the wellbore. Such probes may include, for example, electrical resistivity, compressional and shear wave sonic interval time, bulk density, neutron slowing down length, neutron capture cross-section, natural gamma radiation, and nuclear magnetic resonance relaxation time distribution, among others. The well logging procedure comprises recording of magnitudes of various above mentioned physical properties within a bore-hole using an array of logging probes (FIG. 1, 11), attached with a logging cable (12) connected on the other end to a data recording cabin (13).

Figure 2:
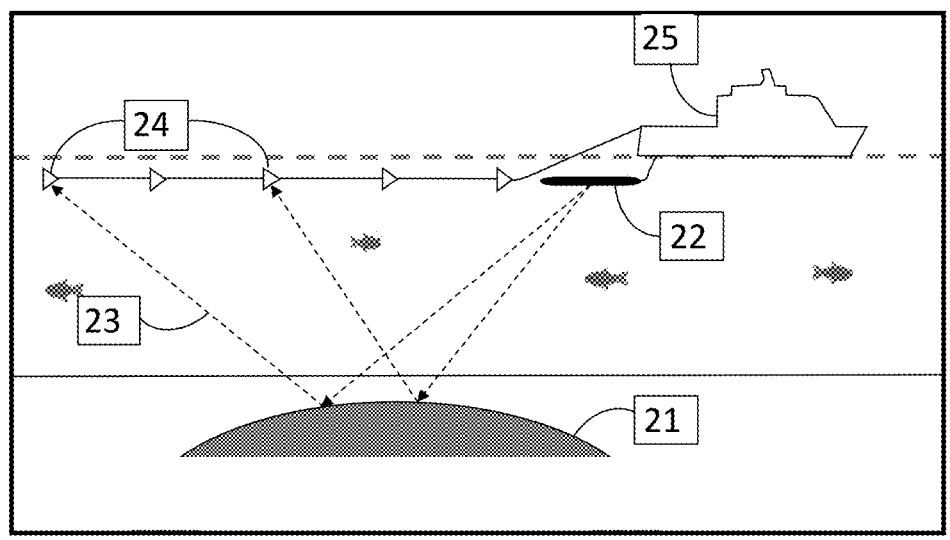
FIG. 2 is an illustration for seismic data acquisition in a marine set up in this case.

Seismic data acquisition is routinely performed both on land and at sea. At sea, seismic vessels deploy one or more cables ("streamers") behind the vessel as the vessel moves forward. Each streamer includes multiple receivers in a configuration generally as shown in FIG. 2. Streamer comprising of receivers (24) trails behind a vessel (25), which moves forward as the survey progresses. As shown in FIG. 2, source (22) is also towed behind vessel (25). Source (22) and receivers (24) typically deploy below the surface of the ocean. Data is transmitted to the ship (25) through the cables that is recorded and processed. Source (22) emits seismic waves which reflect from boundaries (such as, e.g., formation boundary 21). The reflected waves are detected by receivers (24) and recorded as a function of time by determining the time it takes for seismic waves to propagate from source, reflected at a boundary (21) and back to receivers (24). The recorded signal may yield the information of the position, topography of boundary (21), rock, and in-situ fluid properties. The receivers used in marine seismology are commonly referred to as hydrophones, or marine pressure phones. Inversion of seismic data, depending on the procedure, may yield acoustic impedance, shear impedance, P-wave velocity, S-wave velocity, P- to S-wave velocity ratio, and bulk density.

Figure 6:
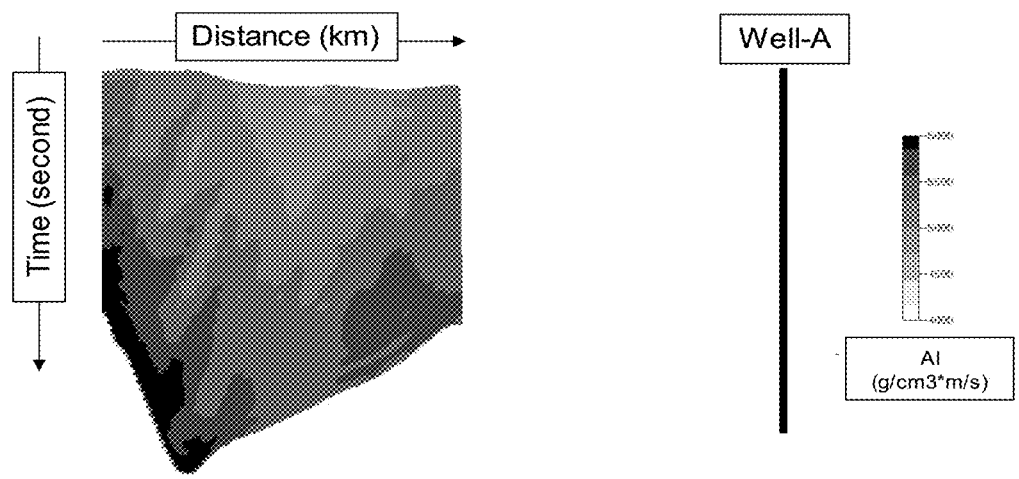
FIG. 6 is an Acoustic impedance (AI) profile inverted from the seismic data. The profile is in time domain plotted against spatial distance. The darker the grey shade, higher is AI.
Figure 7:
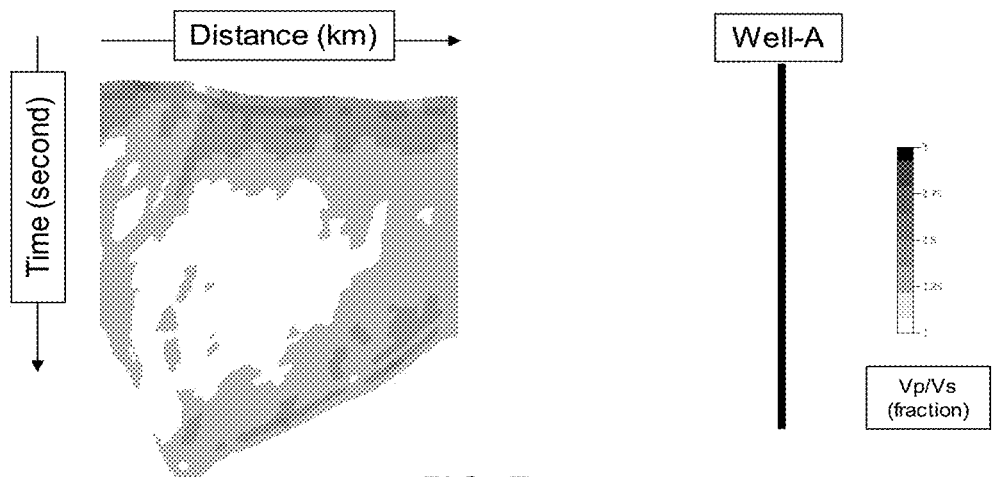
FIG. 7 is a Vp/Vs profile inverted from the seismic data. The profile is in time domain plotted against spatial distance. The darker the grey shade, higher is Vp/Vs.

One embodiment of a method according to the invention, will be explained with reference to the flow chart in FIG. 10. The method of the invention makes use, in some embodiments, of data acquired from at least one wellbore (Well A in this case, FIGS. 6, 7 & 8) drilled through subsurface rock formations in an area of interest. The method of the invention contains first of all the calibration of model using three well-logging probes data appropriate for predicting the magnitude of pore fluid. The response of well-logging tools is dependent on the properties related to the components as well as their respective percentage in the rocks investigated. The tool measuring the compressional sonic transit time through the formations is sensitive to the rock porosity and the fluids it contains. The tool that measures the shear sonic is not sensitive to the fluids; however, it makes discrimination between various lithologies. The method involves converting both the compressional and shear sonic interval time to P- and S-wave velocities (Vp and Vs, respectively (105)). In the Absence of Shear Log, using e.g., Greenberg and Castagna (1992) method is possible with fluid replacement in the relevant zone to compute a synthetic Vs curve (106). The probe measuring the density is sensitive to water, other fluids and the void spaces/porosity between the matrix grains. The product of density with sonic derived velocity is called acoustic impedance. We used acoustic impedance values as a combined augmented response of the sonic and density probes', whereas the Vp/Vs ratio as the contrast in the P-wave and S-wave velocity response within the method of invention (107). The Vp/Vs ratio decreases with an increase in fluid saturation (hydrocarbon or $CO_2$ in the pore spaces) or organic matter, whereas the Vp/Vs increases with increase in porosity or volume of shale.

Acoustic impedance (102) and Vp/Vs ratio (103) are standard outcome of prestack inversion of seismic data. The seismic procedure yields independent measurements within a wide areal extent.

In a salt water-wet porous rocks, the two curves, i.e. acoustic impedance and Vp/Vs ratio respond to porosity. But in case of rock pores filled with hydrocarbon, or $CO_2$ both the acoustic impedance and Vp/Vs measurements respond due to two main effects: 1) the acoustic impedance responds to the presence of porosity and low-density, low-velocity fluids, and 2) the Vp/Vs ratio measurements respond to the rock matrix and pore fluids (gas/oil, $CO_2$). In a rock comprised of 100% matrix content with zero porosity (FIG. 3, 31), the Vp/Vs ratio will be equal to the velocity ratio of the matrix mineral. On the other hand, at water pole (32) the Vs becomes zero, resulting in an infinite Vp/Vs ratio.

The two properties obtained from the well log data are chosen also so that the collection of pairs of values of acquired parameters (namely the acoustic impedance on the one hand and the Vp/Vs ratio on the other) at least partly correspond to the equal fluid saturation volume ($S_{fl}$) for sedimentary rocks comprising a given proportion of matrix or water are substantially identical.

This selection of parameters substantially simplifies the operation for estimating the fluid saturation. In a cross-plot of the two chosen properties, the collection of pairs of values of the said parameters are spread over iso-fluid-saturation curves. A diagram may be drawn where the iso-saturation curved lines converge at the 100% mineral matrix pole (31). A reference curved line (34) representing 0% (or 0 fraction) $S_{fl}$ which joins a perceived water pole (32) with the 100% (or 1 fraction) mineral matrix pole (31).

If we assume the rock consists of a mineral matrix, target fluid (Oil/gas, or $CO_2$ for instance) and water-filled matrix porosity then collection of pairs of values of the parameters serving as reference which is represented by the iso-saturation curved line equivalent to a given fluid percentage within a rock obtained experimentally from values of the two chosen parameters acquired from the data.

This method of determining the G (mineralogy/shaliness coefficient) and n (stress/cementation coefficient) to align the 0% (or 0 fraction) $S_{fl}$ zone data along the 0% (or 0 fraction) fluid reference line implies that, among the zones crossed by the well, some are water-bearing. This is possible if we assume the data pairs with high Vp/Vs ratio values occasionally showing a trend partly parallel to the 0% (or 0 fraction) $S_{fl}$ reference line (34). It is possible to verify the existence of such zones by comparison with other fluid saturation calculation techniques within a basin. The pairs of values are represented by the set of iso-saturation curved lines, from the line with 0% fluid saturation to the line representing 100% fluid saturation volume within the rock pores. The Vp/Vs which corresponds to that is then obtained by applying the following relation (Lee, 2003):

$$\frac{V_P}{V_S} = \frac{1}{[G\alpha(1-\phi)^n]} \quad (1)$$

where Vp is P-wave velocity, Vs is S-wave velocity, G is mineralogy/shaliness coefficient, $\alpha$ is Vs/Vp ratio of the rock matrix, n is stress/cementation coefficient, and we derived $\phi$ as:

$$\phi = \frac{\left(\rho_{ma} - \frac{AI}{V_{P_{ma}}}\right)}{\left\{AI\left[S_{fl}\left(\frac{1}{V_{P_{fl}}} - \frac{1}{V_{P_w}}\right) + \left(\frac{1}{V_{P_w}} - \frac{1}{V_{P_{ma}}}\right)\right] - [S_{fl}(\rho_{fl} - \rho_w) + (\rho_w - \rho_{ma})]\right\}} \quad (2)$$

where $V_{Pma}$, $V_{Pfl}$ and $V_{Pw}$ are the P-wave velocities of the mineral matrix, target fluid and water respectively, $\rho_{ma}$ is density of mineral grains, $\rho_{fl}$ is density of target fluid, $\rho_w$ is density of water, AI is acoustic impedance and $S_{fl}$ is the target fluid saturation (in fraction). Changing the mineralogy/shaliness coefficient 'G' results in a vertical static shift in the curved iso-saturation lines. The stress/cementation coefficient 'n' controls the slope of the iso-saturation curved lines and may be selected in a formation zone depending on level of stress, compaction, or cementation. The matrix and fluid related constants may be taken from Mavko et al (2009) and vendors' logging chart books.

Figure 3:
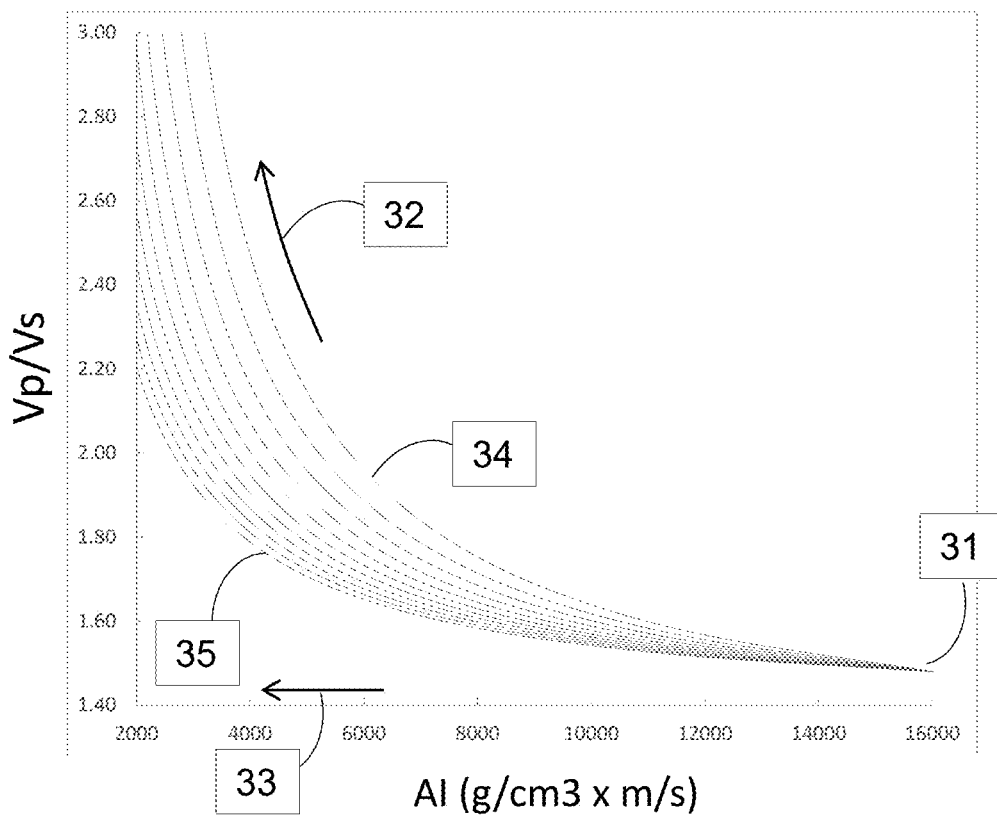
FIG. 3 shows a set of iso-saturation of target fluid curved lines in a three-pole diagram onto the AI-Vp/Vs plane.
Figure 10:
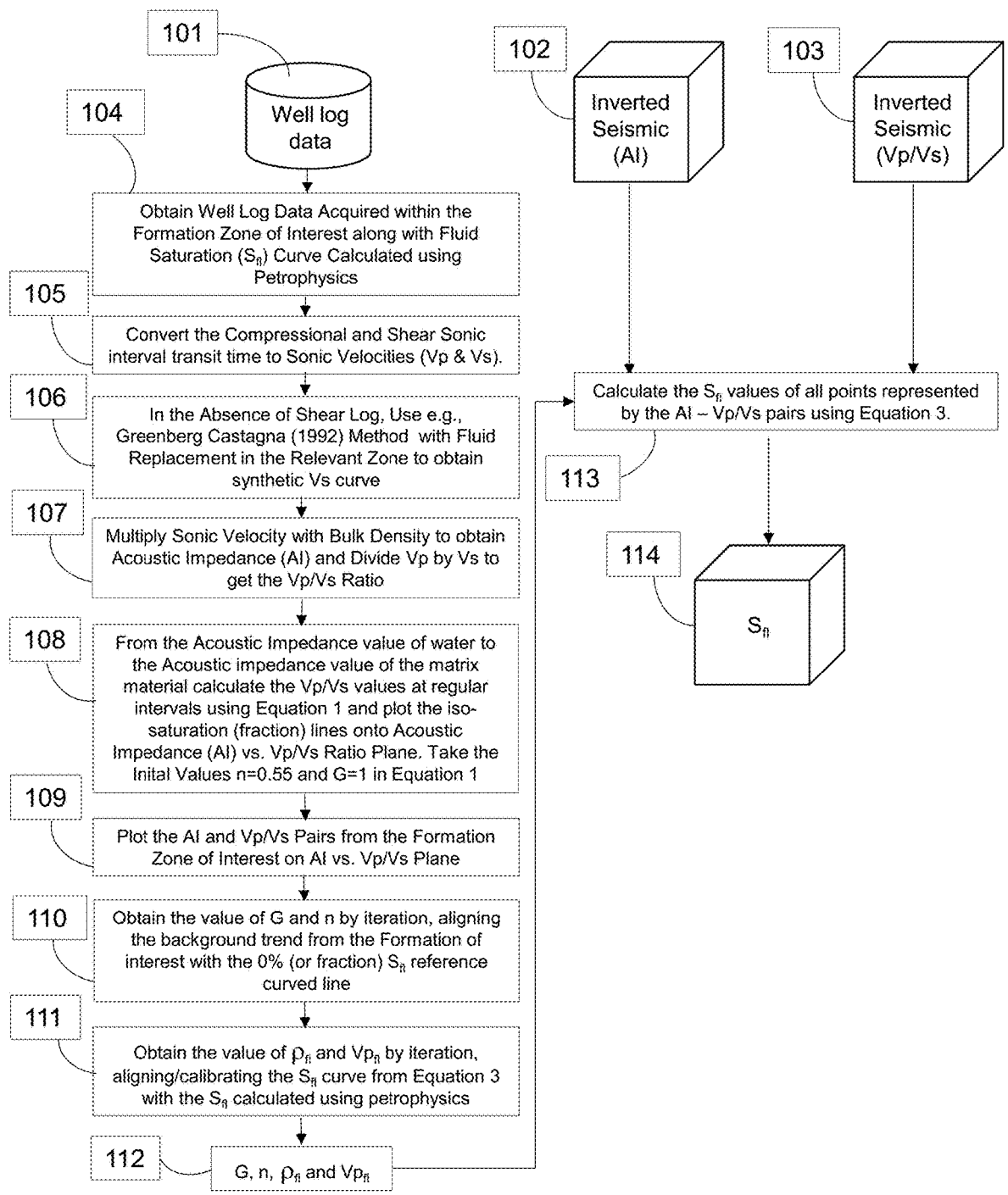
FIG. 10 is a flowchart showing elementary steps in one embodiment of the present inventive method.

From this function (equation 1) we are able to define a set of lines representing different fluid saturations converging at the 100% matrix pole onto the Acoustic impedance—Vp/Vs ratio function plane (FIG. 3 & FIG. 10, step 108).

Rearranging the equation the fluid saturation can be calculated (in fraction) using the following equation:

$$S_{fl} = \frac{\left\{\rho_{ma} + \left[1 - \left(\frac{V_S}{V_P G \alpha}\right)^{\frac{1}{n}}\right](\rho_w - \rho_{ma}) - AI\left[\frac{1}{V_{Pma}} + \left(1 - \left(\frac{V_S}{V_P G \alpha}\right)^{\frac{1}{n}}\right)\left(\frac{1}{V_{Pw}} - \frac{1}{V_{Pma}}\right)\right]\right\}}{\left\{\left[1 - \left(\frac{V_S}{V_P G \alpha}\right)^{\frac{1}{n}}\right]\left[AI\left(\frac{1}{V_{Pfl}} - \frac{1}{V_{Pw}}\right) - (\rho_{fl} - \rho_w)\right]\right\}} \quad (3)$$

Figure 4:
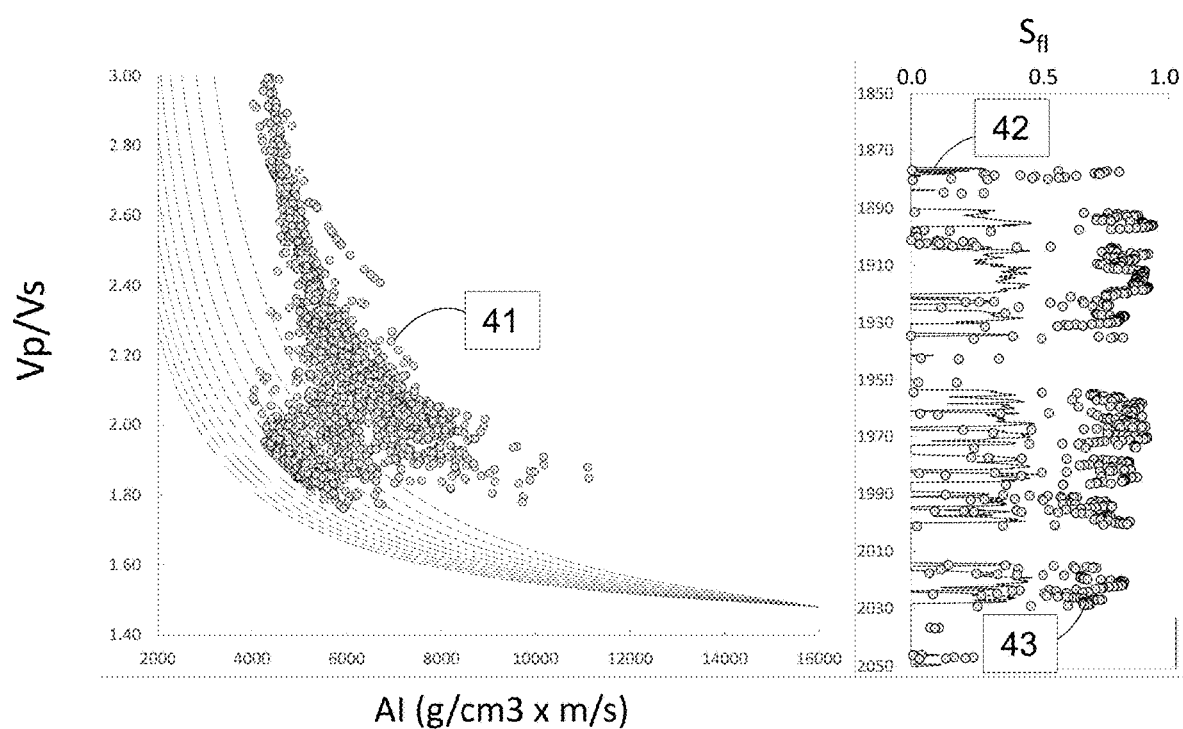
FIG. 4 illustrates the plotting of the set of pairs on the same diagram of values of the parameters acquired in a well by three well-logging probes before the $S_{fl}$ calibration.
Figure 5:
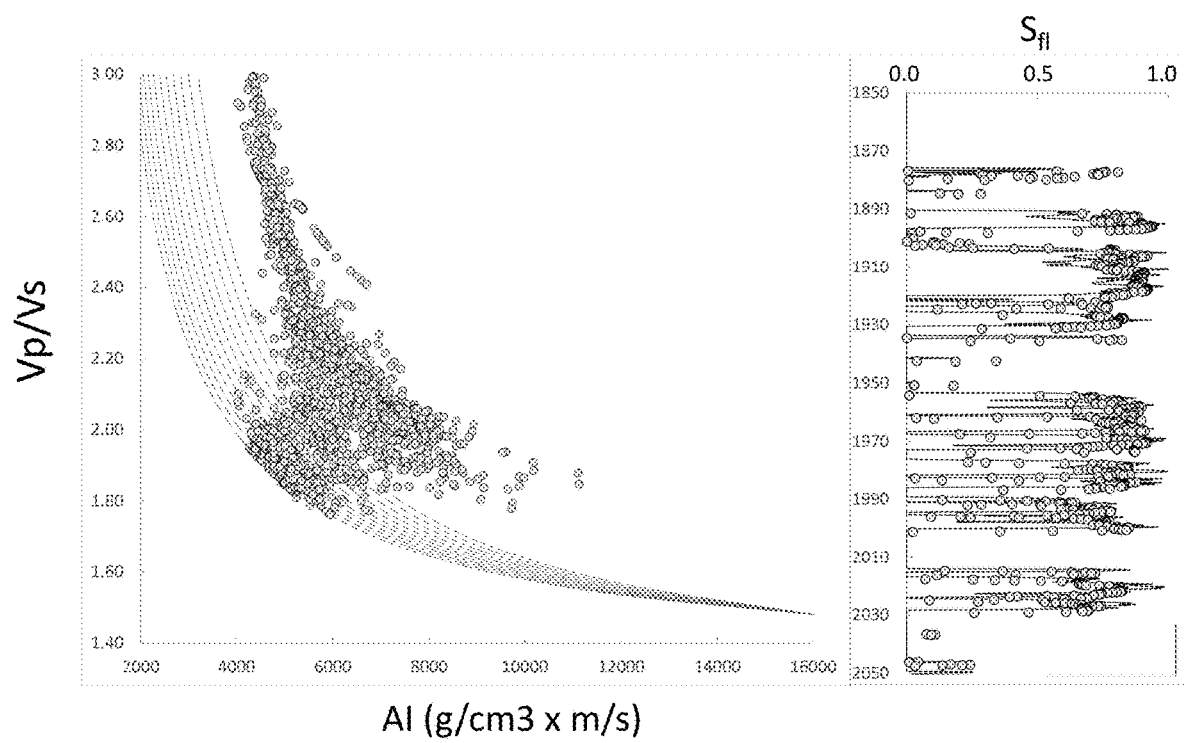
FIG. 5 illustrates the plotting of the set of pairs on the same diagram of values of the parameters acquired in a well by three well-logging probes after the $S_{fl}$ calibration.

Until now the G, n, $Vp_{fl}$, and $\rho_{fl}$ are unknown. Plotting the well data (41) onto AI-Vp/Vs plane (FIG. 4) with some initial G and n values, and iterating the values of G and n making the perceived part of the data representing the 100% water-saturated matrix to align with the 0% (or 0 fraction) fluid saturation line. The difference of $S_{fl}$ calculated using equation 3 (42) with $S_{fl}$ obtained from traditional petrophysical method (43) shows that the model is still not calibrated (FIG. 4). Iterating the $Vp_{fl}$ and $\rho_{fl}$ values so that the Sif calculated using equation 3 calibrates with $S_{fl}$ obtained from traditional petrophysical method (FIG. 5). The obtained G, n, $Vp_{fl}$ and $\rho_{fl}$ values (FIG. 10, 112) are employed to insert in the step (113).

Figure 8:
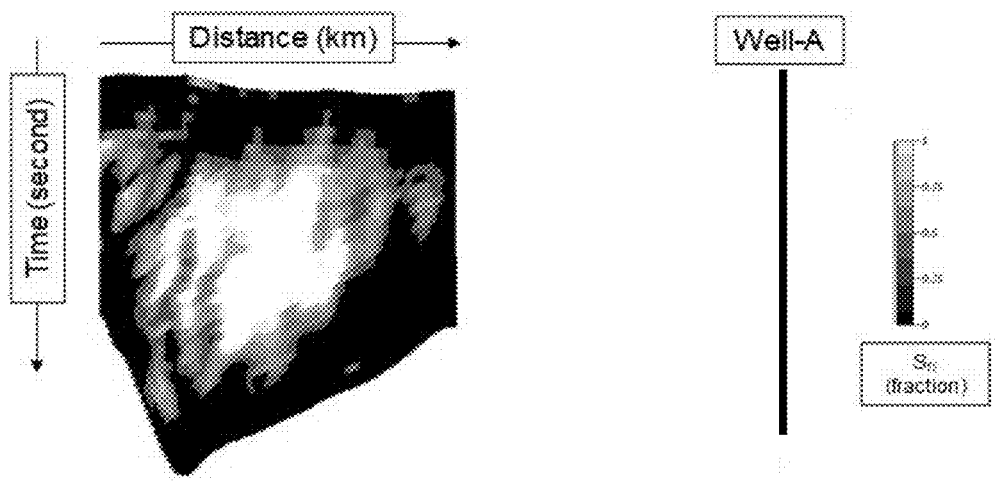
FIG. 8 is the fluid saturation ($S_{fl}$) output obtained after using equation 2, represented by grey shades. The lighter the grey shade, higher is the target fluid saturation.
Figure 9:
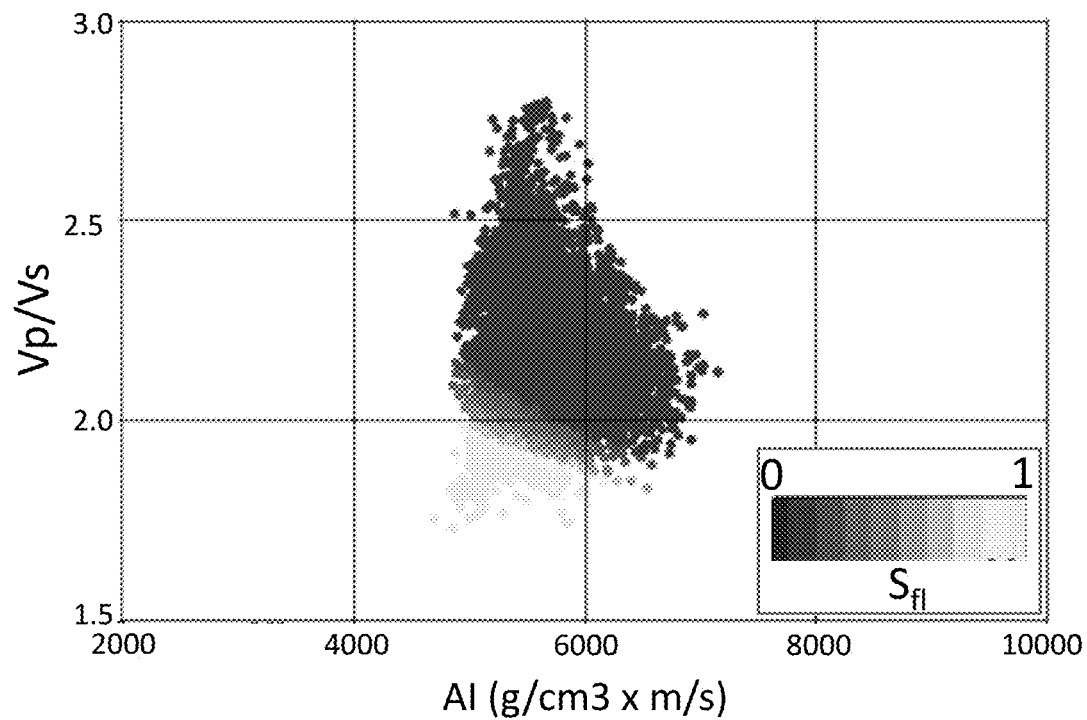
FIG. 9 shows the Vp/Vs plotted against the AI, both obtained from the inverted seismic data. The fluid saturation ($S_{fl}$) calculated using the present method of the invention is represented by grey shades. The lighter the grey shade, higher is the target fluid saturation.

Putting both the AI (FIG. 6 & FIG. 10, step 102) and Vp/Vs (FIG. 7 & FIG. 10, step 103) data from inverted seismic data with the G, n, $Vp_{fl}$, and $\rho_{fl}$ in equation 3 and calculate (113) to obtain the fluid saturation ($S_{fl}$)(114). The obtained $S_{fl}$ profile in this embodiment is shown in FIG. 8, and the computed points from selected data plotted onto an AI versus Vp/Vs plane are illustrated in FIG. 9.

The technical solution is only one embodiment of the present invention, to those skilled in the art, the present invention discloses a fundamental principle of the method and applications, straightforward to make various types of modifications or variations, the method is not limited to the specific embodiments of the present invention described above, and therefore the manner described above are only 355 preferred and is not in a limiting sense.

REFERENCES CITED

PATENT DOCUMENTS

| | | | |
|---|---|---|---|
| NO | NO20191431 | September 2021 | Manzar Fawad, MD Nazmul Haque Mondol |
| US | U.S. Pat. No. 5,583,825A | December 1996 | James Carrazzone, David Chang, Catherine Lewis, Pravin Shah, David Wang |
| US | U.S. Pat. No. 6,269,311B1 | July 2001 | James Berryman |
| US | 20090306899A1 | December 2009 | Peter Harris, Joel Walls |
| US | 2010142323A1 | June 2010 | Dez Chu, Grant A. Gist |
| US | U.S. Pat. No. 6,421,611B1 | July 2002 | Michael Kelly, Charles Skidmore, Raymond Cotton, William May, Richard Lindsay, Davis Ratcliff |
| US | U.S. Pat. No. 7,373,251B2 | May 2008 | Jeffry Hamman, Donald Caldwell, Fabien Allo, Raphael Bornard, Thierry Coleou, Thierry Crozat, Bernard Deschizeaux, Yves Lafet, Pierre Lanfranchi, Amelie Molle |

OTHER PUBLICATIONS

Aki, K., and P. G. Richards (1980), "Quantitative Seismology: Theory and Methods", Freeman.

Avseth, P., and T. Veggeland (2015): "Seismic screening of rock stiffness and fluid softening using rock-physics attributes: Interpretation", v. 3, no. 4, p. SAE85-SAE93.

Avseth, P., T. Veggeland, and F. Horn (2014): "Seismic screening for hydrocarbon prospects using rock-physics attributes", The Leading Edge, v. 33, no. 3, p. 266-274.

Connolly, P. (1999): "Elastic impedance", The leading edge, v. 18, no. 4, p. 438-452.

Fatti, J. L., G. C. Smith, P. J. Vail, P. J. Strauss, and P. R. Levitt (1994): "Detection of gas in sandstone reservoirs using AVO analysis: A 3-D seismic case history using the Geostack technique", Geophysics, v. 59, no. 9, p. 1362-1376.

Gassmann, F. (1951): "Über die elastizität poröser medien: Vierteljahrss-chrift der Naturforschenden Gesellschaft", in Zurich 96, 1-23: Paper translation at http://sepwww.stanford.edu/sep/berryman/PS/gassmann.pdf.

Goodway, B., T. Chen, and J. Downton (1997): "Improved AVO fluid detection and lithology discrimination using Lamé petrophysical parameters; "λρ", "μρ", & "λ/μ fluid stack", from P and S inversions", in SEG Technical Program Expanded Abstracts 1997: Society of Exploration Geophysicists, p. 183-186.

Greenberg, M. L., and J. P. Castagna (1992): "Shear-wave velocity estimation in porous rocks: theoretical formulation, preliminary verification and applications 1," Geophysical prospecting v. 40, no. 2, p. 195-209.

Lee, M. W. (2003): "Velocity ratio and its application to predicting velocities", US Department of the Interior, US Geological Survey.

Lehocki, I., P. Avseth, and N. H. Mondol (2019): "Seismic methods for fluid discrimination in areas with complex geological history—a case example from the Barents Sea", Interpretation, v. 8, no. 1, p. 1-43.

Mavko, G., T. Mukerji, and J. Dvorkin (2009): "The rock physics handbook: Tools for seismic analysis of porous media", Cambridge University Press.

Shuey, R. T. (1985): "A simplification of the Zoeppritz equations", Geophysics, v. 50, no. 4, p. 609-614.

Smith, G. C., and P. M. Gidlow (1987): "Weighted stacking for rock property estimation and detection of gas", Geophysical Prospecting, v. 35, no. 9, p. 993-1014.

Verm, R., and F. Hilterman (1995): "Lithology color-coded seismic sections: The calibration of AVO crossplotting to rock properties", The Leading Edge, v. 14, no. 8, p. 847-853.

Whitcombe, D. N. (2002): "Elastic impedance normalization", Geophysics, v. 67, no. 1, p. 60-62.

Zoeppritz, K. (1919): "Über Reflexion and Durchgang seismischer Wellen durch Unstetigkeitsflächen: Nachrichten von der Gesellschaft der Wissenschaften zu Göttingen, Mathematisch-Physikalische Klasse", v. 1919p. 66-84.

What is claimed is:

1. An analytical method to predict fluid saturation $S_{fl}$ in a subsurface reservoir comprising the following steps:

using a first acoustic impedance (102) and a first P- to S-wave velocity ratio (103) inverted from seismic data, and at least one nearest well providing three well-logging probes measuring three different parameters (101) selected so that:

a) a product of P-wave velocity of sound obtained from a first well-logging probe with density data obtained from a second well-logging probe and target fluid in sedimentary rocks represents a second acoustic impedance, b) a third well-logging probe obtains S-wave velocity of sound and produces measurement signals hereby modified to a second P- to S-wave velocity ratio (107) developing in opposite directions to each other due to target fluid variation, on one hand, and water content, on another hand, in the sedimentary rocks, and c) the three well-logging probes being further selected so that resulting pairs within an acoustic impedance and P- to S-wave velocity ratio plane correspond to an equal fluid saturation, associated respectively with the sedimentary rocks comprising a given percentage of rock matrix or water, are equally represented by one pair of values of representative parameters of 100% fluid saturation, creating a system of sets of pairs of values of the representative parameters, to obtain a continuous representation of fluid saturation of a formation of interest penetrated by the at least one nearest well, the analytical method characterised by:

d) calibrating a brine saturated rock trend within the formation of interest (110), simultaneously obtaining a cementation factor 'n' and a mineralogy factor 'G' to further use in calculations, e) calibrating a first fluid saturation computed from the second acoustic impedance and P- to S-wave ratio curves with a second fluid saturation obtained from a conventional method by iterating a P-wave velocity '$Vp_{fl}$' and a density '$\rho_{fl}$' of the target fluid, therefore obtaining values for the P-wave velocity '$Vp_{fl}$' and the density '$\rho_{fl}$' (111) to further use in the calculations, f) inverting the seismic data to obtain the first acoustic impedance (102) and the first P- to S-wave velocity ratio (103), g) estimating the fluid saturation $S_{fl}$ (114) using a calibrated rock physics model by inputting corresponding data (113), whereby $S_{fl}=1-S_w$, wherein $S_w$ is water saturation.

2. The analytical method of claim 1, wherein the three well-logging probes are employed and adapted for measuring the density data of the formation of interest, compressional wave transit time, and shear wave transit time of the sound through ground.

3. The analytical method of claim 2, wherein the compressional wave transit time and the shear wave transit time of the sound obtained with the first well-logging probe and the third well-logging probe are converted to the P-wave velocity and the S-wave velocity (105), whereby the product of the P-wave velocity with the density data obtained using the second well-logging probe is the second acoustic impedance, and the P-wave velocity divided by the S-wave velocity yields the second P- to S-wave velocity ratio (107).

4. The analytical method of claim 2, wherein the third well-logging probe measures the shear wave transit time of a zone in the formation of interest, the first well-logging probe measures the compressional wave transit time, and the second well-logging probe measures the density data through the zone, wherein a representation diagram is chosen as a function of the second P- to S-wave velocity ratio and of the second acoustic impedance, wherein the system of sets of pairs of values of the representative parameters, each pair of values associated with a same fluid saturation, may be likened to a set of parallel iso-fluid saturation curves (108), the same fluid saturation associated with each pair of values of the second acoustic impedance and of the second P- to S-wave velocity ratio measured in the at least nearest well being determined by identifying an iso-fluid saturation curve passing through a point representative of a pair of values (109) in the representation diagram.

5. The analytical method of claim 4, wherein slopes of the set of parallel iso-fluid saturation curves is controlled by the cementation factor 'n' that is selected for a formation zone considering cementation or stress level at a corresponding depth/temperature.

6. The analytical method of claim 4, wherein static shift of the set of parallel iso-fluid saturation curves is controlled by the minerology factor 'G' that is controlled by a mineralogy of matrix grains and clay content.

7. The analytical method of claim 4, wherein a magnitude of curvature of the set of parallel iso-fluid saturation curves depends on the P-wave velocity and the density data of the target fluid.

8. The analytical method of claim 2, wherein the cementation factor 'n' and the mineralogical factor 'G' are determined by iteration, first aligning 100% water-saturated borehole data onto the acoustic impedance and P- to S-wave velocity ratio plane with 100% water saturation (brine trend) reference curved line (110), whereas iterating the P-wave velocity and the density data of the target fluid yield corresponding values, setting a 100% fluid line, while calibrating with saturation logs calculated by traditional petrophysical methods (111).

9. The analytical method as claimed in claim 2, wherein in case the shear wave transit time was not acquired in the at least nearest well, a synthetic S-wave data is used within the formation of interest (106).

10. The analytical method of claim 1, wherein a reference set is established by selecting, from all pairs of values acquired from the first acoustic impedance and the first P- to S-wave velocity ratio inverted from the seismic data, at least one specific pair of values for which a given fluid saturation in fraction or equivalent percentage may be associated.

11. The analytical method of claim 1, wherein quantities from each pair of values of the representative parameters acquired from the second acoustic impedance and the second P- to S-wave velocity ratio are demonstrated in a diagram as a function of coordinates, one coordinate representing the second acoustic impedance in the sedimentary rock and the other coordinate representing the second P- to S-wave velocity ratio, where the system of sets of pairs of values equivalent to a corresponding content are manifested by a system of curved lines parallel to a reference curved line representing a zero fluid saturation in fraction or equivalent percentage, to which a given fluid saturation may be allocated, wherein a position of the given fluid saturation is being ascertained by at least two representative points, one representative point being associated with a rock which contains only matrix and the given fluid saturation, the other representative point being associated with a pair of values acquired by input data with which the given fluid saturation may be associated.

12. The analytical method of claim 11, wherein positions of iso-fluid saturation curved lines are determined between an axis with 100% rock matrix on one end and 100% fluid saturation on the other end, both represented by the pair of values of the representative parameters.

13. The analytical method of claim 1, wherein the system of sets of pairs of values typical of target fluids and of the rock matrix are obtained from existing literature.

* * * * *